United States Patent [19]
Bordini et al.

[11] 4,268,578
[45] May 19, 1981

[54] COATED POLYOLEFIN FILMS HAVING A LOW ADHERENCE TO THE WELDING BARS OF WELDING MACHINES

[76] Inventors: Fosco Bordini, 2, Via Vico Maniscalchi; Luigi Mauri, 16, P.zza del Mercato, both of Terni, Italy

[21] Appl. No.: 953,876

[22] Filed: Oct. 23, 1978

[30] Foreign Application Priority Data

Oct. 24, 1977 [IT] Italy ................................ 28896 A/77

[51] Int. Cl.³ .................. B05D 3/10; B32B 27/06; B65D 29/02
[52] U.S. Cl. ................................. 428/413; 206/524.3; 206/524.6; 229/53; 426/127; 427/416; 427/412.3; 428/484; 428/522; 428/523; 428/910
[58] Field of Search ............... 428/483, 413, 516, 518, 428/520, 910, 484, 522, 523; 427/407, 407 E, 416

[56] References Cited

U.S. PATENT DOCUMENTS

| 3,088,844 | 5/1963 | Hungerford et al. | 428/516 |
| 3,442,687 | 5/1969 | Hagan | 427/407 E |
| 3,753,769 | 8/1973 | Steiner | 428/516 |
| 4,105,118 | 8/1978 | Williams, Jr. et al. | 428/516 |

FOREIGN PATENT DOCUMENTS 46-29638 8/1971 Japan ................................ 427/407 E

*Primary Examiner*—James C. Cannon

[57] ABSTRACT

There are disclosed polyolefinic films carrying two coatings, the first coating consisting of amino compounds and the second of a mixture of vinyl or vinylidene polymers or copolymers, epoxy resins and microcrystalline waxes, and which films, by virtue of the coatings, are readily thermoweldable, impervious to gases and vapors, and have improved resistance to sticking to the bars of conventional automatic and semi-automatic welding machines. A process for preparing the new polyolefinic films is also disclosed.

14 Claims, No Drawings

COATED POLYOLEFIN FILMS HAVING A LOW ADHERENCE TO THE WELDING BARS OF WELDING MACHINES

THE PRIOR ART

Patents assigned to Montedison S.p.A. have described the preparation of films of polymeric alpha-olefins consisting prevailingly of macromolecules of isotactic structure and obtained by polymerizing alpha-olefins, in particular propylene, in the presence of stereospecific catalysts.

Due to their mechanical, protective and optical properties, films obtained from crystalline polyolefins, particularly those obtained from crystalline polypropylene, find their widest field of application as starting materials for the production of containers, covers, bags, vessels and, in general, for articles intended for the packaging industry.

One difficulty encountered in developing applications of the polyolefinic films for the packaging industry is the fact that most of the available automatic and semi-automatic packaging machines cannot be used for transforming said films into finished packages because the machines have been designed and built, keeping in mind the characteristics of the most commonly used films, i.e., those made of cellophane, and are not capable of processing or transforming thermoplastic films such as those of the polyolefins, especially of polypropylene, into commercially acceptable packaging articles.

The basic difference between the polyolefinic films, particularly the polypropylene films, and cellophane films, sofaras concerns conversion thereof to bags and other packaging articles, is that the polyolefinic films are thermoplastic whereas cellophane is a material which is insensitive to heat at temperatures below the temperature at which it becomes inflammable. As a consequence of said difference, the polyolefinic films and cellophane films exhibit different behavior with respect to the automatic and semi-automatic thermowelding devices connected with the conventional packaging machines.

While, in fact, the cellophane films, which are normally coated with a thermoplastic lacquer that makes the film weldable by heat, actually weld without difficulty, the polyolefinic films, and especially the polypropylene films, melt at the points of contact with the welding elements and tend to stick to said elements and to tear, thus making it impossible, in practice, to maintain a reasonable, commercially feasible operating speed of the packaging machine.

It is known that the thermoweldability and impermeability of synthetic polymer films can be improved by coating the films with materials imparting those characteristics to them.

In general, such coating is achieved by extrusion of a lacquer, in the molten state, (extrusion coating), on the supporting film. Another method consists in lamination of two films to each other, with or without interposed adhesives. Still another method consists in spreading a solution of the coating agent in a suiable solvent on the supporting film.

As is also known, the coating agent may be coupled with a primer which facilitates adhesion of the coating to the supporting film. Often the primer is substituted by, or accompanied by, a pre-treatment of the supporting film with chemical agents, electrical non-piercing discharges, a flame, or other similar means.

Also known are processes involving coating of the polyolefinic films with:

1. a first layer consisting of an amine compound, in particular polyethyleneimine which serves to promote the anchoring of the lacquer to the support, and with
2. a second layer consisting of a mixture of epoxy resins and vinyl or vinylidene polymers or copolymers, or consisting of mixtues of epoxy resins, vinyl or vinylidene polymers or copolymers and alkylacrylate or alkylmethacrylate polymers or copolymers.

The films thus obtained show very good resistance values of the welds, but they have a poor resistance to sticking to the welding bars of the packaging machines.

THE PRESENT INVENTION

An object of this invention is to provide polyolefinic films which, without loss of their good optical properties, are readily thermoweldable on the conventional automatic and semi-automatic packaging machines, are impermeable to gases and vapors, and have improved resistance to sticking to the welding bars of the machines.

A specific object is to provide films as aforesaid and made of normally solid polypropylene consisting essentially of recurring propylene units and having a substantial crystalline polypropylene content.

A more specific object is to provide films as afoesaid and made of isotactic polypropylene, i.e., polypropylene consisting essentially of isotactic polypropylene made up of isotactic macromolecules which are insoluble in boiling n-heptane and have substantially the isotactic stereoregular structure.

A further object is to provide a process for obtaining polyolefinic films having the characteristics aforesaid.

These and other objects are achieved by this invention in accordance with which the polyolefinic films which are not only readily thermoweldable and impervious to gases and vapors but also exhibit improved resistance to sticking to the welding bars of the conventional automatic and semi-automatic packaging machines are obtained by applying two coatings to at least one side of the polyolefinic film, a first coating or layer consisting of amine or imino compounds and a second coating or layer consisting of a mixture of, by weight:

(a) 50–80% of vinyl or vinylidene polymers or copolymers;
(b) 10–40% of epoxy resins;
(c) 0.5–5% of microcrystalline waxes.

The coatings may be applied to either unstretched polyolefinic films or to films pre-stretched in one or both directions, with or without pre-treatment of the films electrically, or with a flame, or by other means, e.g., chemical oxidation.

When the coatings are applied to unstretched polyolefinic films, or to such films pre-stretched in only one direction, stretching or stretchings can be carried out on the coated films.

The coatings may be applied on one or both faces or sides of the polyolefinic film and may be applied by known methods, using solutions or dispersions of the coating materials in water or in organic solvents, by spreading (smearing or buttering), by dipping or the like.

The total thickness of the coatings can vary from 1 to 20 microns.

The first layer consists, preferably, of alkylenimine polymers such as polyethyleneimine, polypropyleneimine and the like, or of amine compounds of low molecular weight, such as ethylenediamine, diethylentriamine, tetraethylenpentamine and the like.

The vinyl and vinylidene polymers suitable for use in the mixture constituting the second coating or layer include: polyvinyl chloride, polyvinylacetate, copolymers of vinyl chloride and vinyl acetate, copolymers of vinyl chloride and vinylidene chloride, copolymers of vinylidene chloride and acrylonitrile, and the like.

Particularly suitable epoxy resins for use in the mixture constituting the second coating or layer are the condensation products of epichlorhydrin with phenols.

The microcrystalline was used in the mixture constituting the second coating or layer may be artificial or synthetic waxes or natural waxes consisting of mixtures of esters fatty acids with higher alcohols and, in particular, carnauba wax.

The degree of adhesion of the coating to the supporting film is measured by pressing an ahesive cellulose tape against the surface of the coated film, and then abruptly stripping the tape from said surface. The coatings with an excellent adhesion must remain firmly anchored to the supporting film; the coatings with a poor or bad adhesive capacity are, on the contrary, either partially or totally stripped off from the supporting film.

By the "peeling test" method there is likewise evaluated, by means of a dynamometer, the resistance to tensile stress of the weld.

The peeling test values are considered good when they exceed 80-100 g/cm. However, the resistance values of the weld must be referred to the type of application for which the coated film is intended. Thus, 80-100 g/cm is considered an excellent value when the application is, for instance, the weld of a coated film intended for the wrapping of cigarettes. Quite different is, on the contrary, the case of bags for containing rice, sugar and the like, for which much higher weld resistances are required.

The degree of sticking of the varnished film to the welding elements is found by measuring, by means of an Instron dynamometer, the force per surface unit (g/cm$^2$) necessary for the separation of the film from the welding elements, of a specimen connected to the dynamometer and subjected to welding under conditions similar to those occurring on the packaging machines normally used (temperature=130° C.; pressure=40 psi; time=1 second).

In a preferred embodiment, the supports to which the thermoweldable coatings according to this invention are applied consist of films obtained from propylene polymers prepared with stereospecific catalysts, including normally solid polypropylene consisting essentially of recurring propylene units, having a substantial crystalline polypropylene content, or from isotactic polypropylene as defined hereinabove and in Natta et al U.S. Pat. No. 3,112,300.

Before the film-forming, various adjuvants, such as stabilizers, lubricants, plasticizers, colored pigments, antistatic agents, fillers and the like may be incorporated in the polyolefin. The following examples are given to illustrate the invention in more detail but are not intended to be limiting since various changes and modifications can be made in practicing this invention without departing from the spirit and scope thereof.

EXAMPLE 1

A polypropylene film obtained by extrusion of a propylene polymer consisting prevailingly of macromolecules of isotactic structure, stretched and with a thickness of 20 micron, was subjected to an electronic treatment with a SCAE-type apparatus and then coated, on one side, by means of a thin-leaf buttering machine; with a 1% aqueous solution of polyethyleneimine. Thereupon, the film was dried in an oven and coated with a second layer of a mixture of, by weight:

(a) 77.5% of a vinyl chloride/vinyl acetate copolymer (87-13), having a Fikentscher constant K=46;

(b) 19.5% of an epoxy resin obtained by polycondensation of epinchlorohydrin with bisphenol A, and having a mean molecular weight of 900; and (c) 3% of a carnauba wax in a microcrystalline form, and having a melt point of 80°-90° C., a saponification number of 68-88, and an acidity number of 7-14.

The polymers were applied as a 20% solution in methylethylketone. The solution was prepared at room temperature and after spreading, the film was dried at 90° C. The coated film showed the following characteristics:

thickness of coating: 2 microns
adhesion (scotch-tape test): good
blocking at 43° C. (ASTM D 1146-53): good
transparency: good
slippiness (static attrition coefficient T.M.I.): good
resistance of the weld ("peeling" test): 180 g/cm
welding temperature: 130° C.
stickiness (adhesion) to welding bars at 130° C: 25 g/cm$^2$

EXAMPLE 2

A polypropylene film obtained by extrusion of a propylene polymer consisting prevailingly of macromolecules of isotactic structure, stretched and having a thickness of 25$\mu$, was subjected to an electronic treatment on a SCAE type device and was then coated on one side, using a standard buttering or spreading machine for thin layers, with an aqueous 15% solution of polyethyleneimine. Thereupon the film was dried in an oven and then coated with a layer consisting of a mixture of, by weight:

(a) 58% of vinyl chloride/vinyl acetate copolymer (87-13) having a Fikentscher constant K=48;

(b) 39% of an epoxy resin obtained by polycondensation of epichlorohydrin with bisphenol A, and having a mean molecular weight of 900; and (c) 3% of carnauba wax in a microcrystalline structure having a melt point comprised between 80° and 90° C., a saponification number equal to 68-88, and an acidity number of 7-14.

The polymers were applied as a 20% solution in methylethylketone. The solution was prepared at room temperature.

After the spreading, the film was dried at 90° C. The coated film showed the following characteristics:

thickness of the coating: 2 microns
adhesion (scotch-tape test): good
blocking at 43° C. (ASTM D 1146-53): good
transparency: good
slippiness (static attrition coefficient T.M.I.): good
resistance of the weld ("peeling" test): 200 g/cm
welding temperature: 130° C.
stickiness (adhesion) to welding bars, at 130° C.: 40g/cm

EXAMPLE 3

A film of polypropylene obtained by extrusion of a propylene polymer, consisting prevailingly of macromolcules of isotactic structure, stretched and of a thickness of 25 micron, was subjected to an electonic treatment with a SCAE-type device, and was then coated on one side, using a standard spreading machine for thin sheets, with a 1% aqueous solution of polyethyleneimine. Thereupon, the film was dried in an oven and then coated with a second layer of a mixture consisting of, by weight:

(a) 78.5% of a vinyl chloride/vinyl acetate copolymer (87-13) having a Fikentscher constant K=46;
(b) 19.5% of an epoxy resin obtained by polycondensation of epichlorohydrin with bisphenol A, and having a mean molecular weight of 900; and
(c) 2% of carnauba wax in a microcrystalline structure having a melt point of 80°-90° C., a saponification number of 68-88 and an acidity number of 7-14.

The polymers were applied as a 20% solution in methylethylketone. The solution was pepared at room temperature.

After the spreading the film was dried at 90° C. The coated film showed the following characteristics:
thickness of the coating: 2 microns
adhesion (scotch-tape test): good
blocking at 43° C. (ASTM D 1146-53): good
transparency: good
slippiness (coefficient of static attrition T.M.I.): good
resistance of the weld ("peeling" test): 180 g/cm
welding temperature in ° C.: 130
stickiness to welding bars at 130° C.: 40 g/cm$^2$

EXAMPLE 4

A polypropylene film obtained by extrusion of a propylene polymer consisting prevailingly of macromolecules of isotactic structure, stretched and having a thickness of 25 micron, was subjected to an electronic treatment on a SCAE-type apparatus ans was then coated on one side, using a standard spreading machine for thin sheets, with an aqueous 1% polyethyleneimine solution.

Thereafter the film was dried in an oven, and coated with a second layer consisting of a mixture of, by weight:

(a) 59% of vinyl chloride/vinyl acetate copolymer (87-13) having a Fikentscher constant K=48;
(b) 39% of an epoxy resin obtained by polycondensation of epichlorohydrin with bisphenol A, and having a mean molecular weight of 900; and
(c) 2% of carnauba wax, in microcrystalline form, having a melt point of between 80° and 90° C., a saponification number of 68-88 and an acidity number comprised between 7 and 14.

The polymers were applied as a 20% solution in methylethylketone. After spreading, the film was dried at 90° C. The coated film showed the following characteristics:
thickness of the coating: 2 microns
adhesion (scotch-tape test): good
blocking at 43° C. (ASTM D 1146-53): good
transparency: good
slippiness (static attrition coefficient T.M.I.): good
resistance of the weld ("peeling" test): 200 g/cm
welding temperature: 130° C.
sticking to the welding bars at 130° C.: 65 g/cm$^2$

EXAMPLE 5 (Comparative Test)

A polypropylene film, obtained by extrusion of a propylene polymer consisting prevailingly of macromolecules of isotactic structure, stretched and having a thickness of 25 microns, was subjected to electronic treatment on a SCAE-type device and was then coated on one side by means of a thin-sheet spreading machine, with a 1% aqueous polyethyleneimine solution. Thereafter, the film was dried in an oven and then was coated with a second layer consisting of a mixture of, by weight:

(a) 80% of vinyl chloride/vinyl acetate copolymer (87-13) having a Fikentscher constant K=46; and
(b) 20% of epoxy resin obtained by polycondensation of epichlorohydrin with bisphenol A, and having a mean molecular weight of 900.

The polymers were applied as a 20% solution of methylethylketone. The solution was prepared at room temperature.

After spreading, the film was dried at 90° C. The coated film had the following characteristics:
thickness of the coating: 1.8 micron
adhesion (scotch-tape test): good
blocking at 43° C. (ASTM D 1146-53): absent
transparency: good
slippiness (static attrition coefficient T.M.I.): good
resistance of the weld ("peeling" test): 180g/cm
welding temperature: 130° C.
sticking to the welding bars at 130° C.: 160 g/cm$^2$

EXAMPLE 6 (Comparative Test)

A polypropylene film obtained by extrusion of a propylene polymer consisting prevailingly of macromolecules of isotactic structure, stretched and having a thickness of 25 microns, was subjected to an electonic treatment on a SCAE-type device, after which it was coated on one side, using a standard thin-sheet spreading machine, with an aqueous 1% polyethyleneimine solution. Thereupon, the film was dried in an oven and then coated with a second layer consisting of a mixture of, by weight:

(a) 20% of an epoxy resin obtained by polycondensation of epichlorohydrin with bisphenol A, and having a mean molecular weight of 900;
(b) 80% of polymethylmethacrylate, having an inherent viscosity in $CHCl_3$ at 20° C. $(\eta)=0.20$.

The polymers were applied as a 20% solution in methylethylketone.

The solution was prepared at room temperature. After the spreading, the film was dried in an oven at 90° C.

The coated film showed the following characteristics:
thickness of the coating: 2 microns
adhesion (scotch-tape test): good
blocking at 43° (ASTM D 1146-53): no good
transparency: good
slippiness (static attrition coefficient T.M.I.): good
resistance of the weld ("peeling" test): 350g/cm
welding temperature in ° C.: 130
sticking to the welding bars at 130° C.: 500 g/cm$^2$

EXAMPLE 7 (Comparative)

A polypropylene film obtained by extrusion of a propylene polymer consisting prevailingly of macromolecules of isotactic structure, stretched and having a thickness of 25 microns, was subjected to an electronic treatment on a SCAE-type device, using a standard thin-sheet spreading machine, with an aqueous 1% polyethyleneimine solution. Successively, the film was dried in an oven and then coated with a second layer consisting of a mixture of, by weight:

(a) 70% of a vinyl chloride/vinyl acetate copolymer (87-13) having a Fikentscher constant K=50;
(b) 20% of an epoxy resin obtained by polycondensation of epichlorohydrin with bisphenol A, and having a mean molecular weight of 900;
(c) 10% of a polymethylmethacrylate with an inherent viscosity in CHCl$_3$ at 20° C. ($\eta$)=0.20.

The polymers were applied as a 25% solution in methylethylketone. The solution was prepared at room temperature.

After spreading of the solution, the film was dried in an oven at 90° C., and then was found to have the following characteristics:

thickness of the coating: 2 microns
adhesion (scotch-tape test): good
blocking at 43° C. (ASTM D 1146-53): good
transparency: good
slippiness (static attrition coefficient T.M.I.): good
resistance of the weld ("peeling" test): 200 g/cm
welding temperature: 130° C.
sticking to the welding brs at 130° C.: 235g/cm$^2$ The polyolefins from which the films to be coated in accordance with this invention are, in general, crystalline polymers of alpha-olefins CH$_2$=CHR in which R is an alkyl radical containing from 1 to 6 carbon atoms.

What we claim is:

1. Coated thermoweldable polyolefin film having improved resistance to sticking to the thermowelding bars, comprising a polyolefin film primed with an alkylenimine polymer and coated with a mixture consisting of from 50 to 80% by weight of a vinyl or vinylidene homopolymer or copolymer, from 10 to 40% by weight of an epoxy resin and from 0.5 to 5% by weight of microcrystalline wax.

2. Coated thermoweldable polyolefinic films according to claim 1, said films being films of normally solid polypropylene consisting essentially of recurring propylene units and having a substantial cyrstalline polypropylene content.

3. Coated thermoweldable polyolefinic films according to claim 1, said films being films of isotactic polypropylene.

4. Process for preparing coated thermoweldable polyolefin film having improved resistance to sticking to the thermowelding bars, which comprises applying a coating mixture consisting of from 50% to 805 by weight of a vinyl or vinyl-idene homopolymer or copolymer, from 10% to 40% by weight of an epoxy resin and from 0.5to 5% by weight of a microcrystalline wax, to a polyolefin film to which has been applied an intermediate primer coating of an alkylenimine polymer or of a low molecular weight polyamine.

5. The process of claim 4, in which the polyolefin film is stretched in one or both directions.

6. The process of claim 4 or 5, in which the polyolefin film comprises polypropylene.

7. The process of claim 4, in which the vinyl copolymer is a vinyl chloride-vinyl acetate copolymer, the epoxy resin is a polycondensate of epichlorhydrin and phenols, and the microcrystalline wax is carnauba wax.

8. The process of claim 4, in which the alkylenimine polymer is polyethylenimine or polypropylenimine.

9. The process of claim 4 or 5 in which the polyolefinic film is a film of normally solid polypropylene consisting essentially of recurring propylene units and having a substantial crystalline polypropylene content.

10. The process of claim 4 or 5 in which the polyolefinic film is a film of polypropylene consisting prevailingly of macromolecules of isotactic structure.

11. The process of claim 4 or 5 in which the polyolefinic film is a film of isotactic polypropylene.

12. The process of claim 4 in which the intermediate primer coating applied to the polyolefinic film consists of a polymer of an alkyleneimine.

13. The process of claim 12 in which the alkyleneimine polymer is polyethyleneimine.

14. The process of claim 12 in which the alkyleneimine polymer is polypropyleneimine.

* * * * *

UNITED STATES PATENT AND TRADEMARK OFFICE
CERTIFICATE OF CORRECTION

PATENT NO. : 4,268,578
DATED : May 19, 1981
INVENTOR(S) : Fosco BORDINI et al

It is certified that error appears in the above—identified patent and that said Letters Patent is hereby corrected as shown below:

On the title page, Item [73] should read:

- - - MOPLEFAN S.p.A., Milan, Italy - - -.

Signed and Sealed this

Twentieth Day of October 1981

|SEAL|

Attest:

GERALD J. MOSSINGHOFF

*Attesting Officer*     *Commissioner of Patents and Trademarks*